United States Patent [19]
Jaklitsch et al.

[11] Patent Number: 5,953,123
[45] Date of Patent: Sep. 14, 1999

[54] FIXED INTERVAL BACKGROUND AUTO-ALIGNMENT FOR CLOSED LOOP INTERFEROMETRIC FIBER OPTIC GYROSCOPES

[75] Inventors: James Joseph Jaklitsch, Parkton, Md.; Jay Michael Markey, York, Pa.

[73] Assignee: AAI Corporation, Cockeysville, Md.

[21] Appl. No.: 09/002,086

[22] Filed: Dec. 31, 1997

[51] Int. Cl.$^6$ ........................................ G01C 19/72
[52] U.S. Cl. ............................................. 356/350
[58] Field of Search ............................................ 356/350

[56] References Cited

U.S. PATENT DOCUMENTS

| | | | |
|---|---|---|---|
| 4,948,252 | 8/1990 | Cekorich | 356/350 |
| 5,351,123 | 9/1994 | Spahlinger | 356/350 |

Primary Examiner—Samuel A. Turner
Attorney, Agent, or Firm—Venable; James R. Burdett; Catherine A. Ferguson

[57] ABSTRACT

This invention relates to an improved method and mechanism by which to align closed loop interferometric fiber optic gyroscopes. Such method and means includes aligning the gyroscope periodically at fixed time intervals; providing multiplexed control of the gyroscope's internal phase rebalance control loop and gain scaling control loop, enabling one or the other, but never both simultaneously, and thereby eliminate acceleration-dependent errors; eliminating the 1 LSB phase discontinuity produced during each roll-over in the gyroscope by adding an offset to the output ramp produced by said serrodyne ramp generator; and providing a means and method to align the phase-rebalance loop gain for each production unit.

51 Claims, 10 Drawing Sheets

SQUARE WAVE BIASING MODULATION

USE OF BIASING MODULATION TO MAXIMIZE INTERFEROMETER SENSITIVITY

SERRODYNE RAMP MODULATION

COMPOSITE MODULATION WAVEFORM

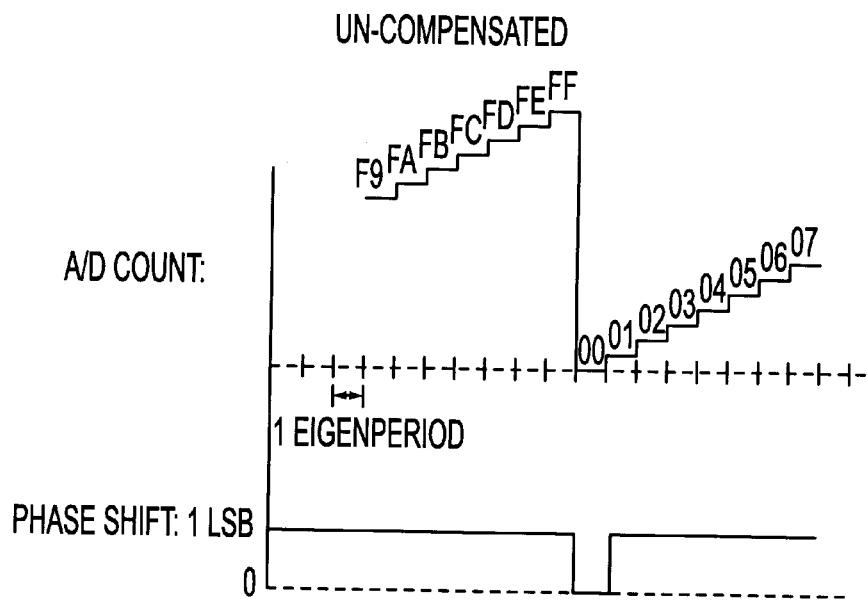
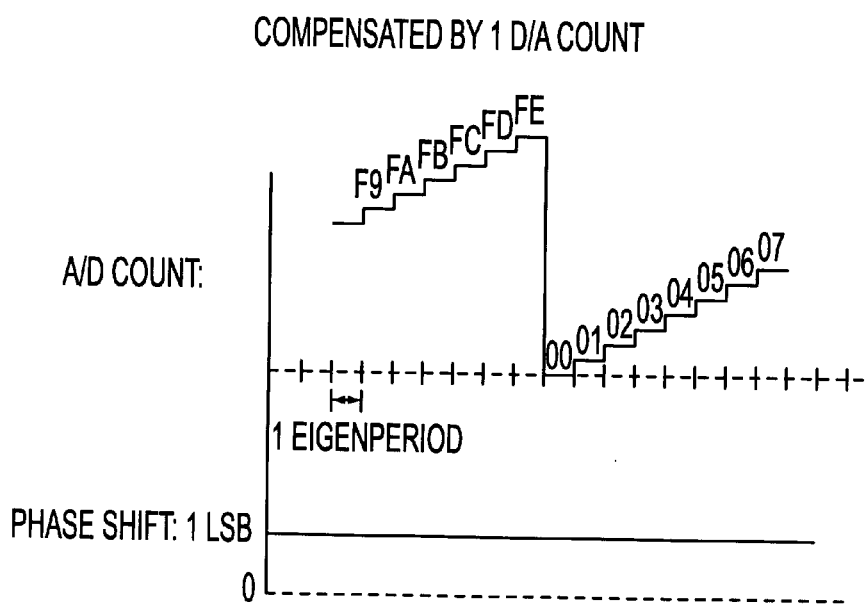

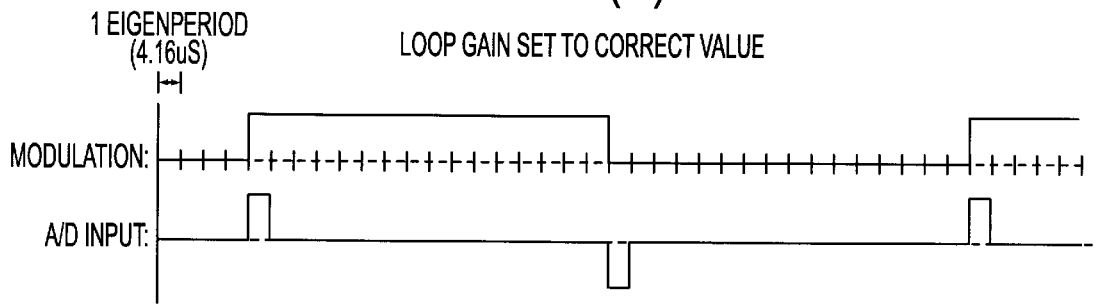
FIG. 8(A) LOOP GAIN SET TO CORRECT VALUE
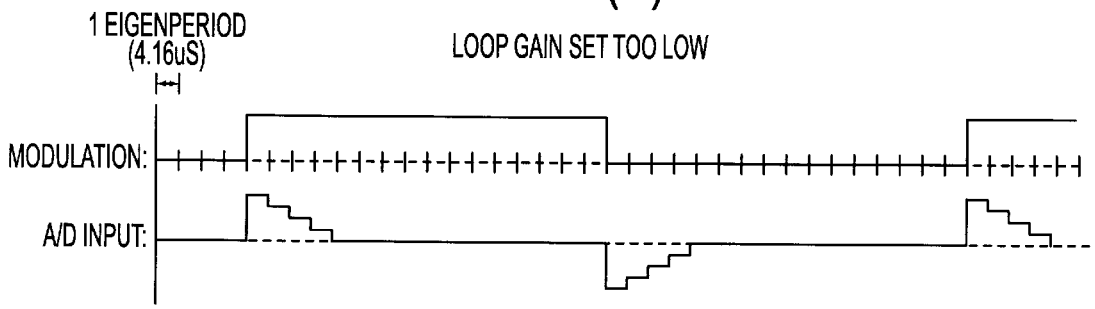
FIG. 8(B) LOOP GAIN SET TOO LOW
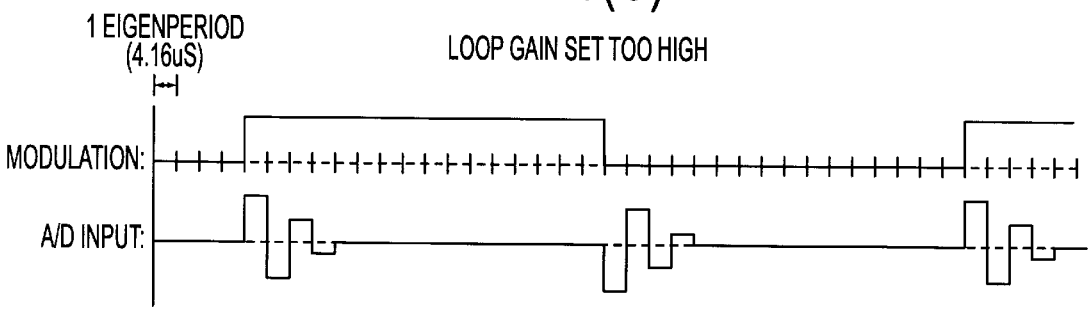
FIG. 8(C) LOOP GAIN SET TOO HIGH

FIXED INTERVAL BACKGROUND AUTO-ALIGNMENT FOR CLOSED LOOP INTERFEROMETRIC FIBER OPTIC GYROSCOPES

CROSS REFERENCE TO RELATED APPLICATIONS

This application is related to "An Improved Method For Stabilizing The Phase Modulator Transfer Function in Closed Loop Interferometric Fiber Optic Gyroscopes" Application Ser. No. 09/002,085 filed Dec. 31, 1997 by James Joseph Jaklitsch and Jay Michael Markey, commonly owned, and incorporated herein by reference.

BACKGROUND OF THE INVENTION

The present invention relates to an improved means for aligning a closed loop interferometric fiber optic gyroscope. Fiber optic gyroscopes are used to sense rotation. Closed loop interferometric fiber optic gyroscopes (IFOGs) sense angular rate by propagating light in counter-rotating directions around a fiber optic spool as shown in FIG. 1. The fiber optic spool is wound around the axis in which rotation is to be sensed. A broadband light source (1) injects light through a coupler (2), into an integrated optics chip (IOC) (3). In the IOC, the light is split into two paths and injected in counter-rotating directions through the fiber spool (5). The optical fiber has a typical length of 100 to 2,000 meters. Rotation of the fiber optic spool around the axis in which rotation is to be sensed causes an effective optical path length increase in one direction with a corresponding path length decrease in the other direction. Consequently, the light propagating through the fiber spool is shifted in phase in accordance with a phenomena known as the Sagnac Effect. The light wave traveling in the rotation direction acquires a phase lead, while the opposite traveling wave acquires a phase lag. The composite phase shift is proportional to the rotation rate that is desired to be measured. Small rotation rates produce small phase shifts, while large rotation rates produce large phase shifts. The light wave is then routed back through the IOC (3) and the coupler (2) to an interferometric phase detector. The counter-rotating light beams produce an optical interference pattern at the phase detector (6), with phase proportional to the rotation rate of the fiber spool (5).

As shown in FIG. 3(b), the interference pattern at the phase detector follows a raised-cosine pattern. This interference pattern is caused by the difference in phase of the two light waves. The difference in phase is proportional to the rotation rate. That is, the output of the phase detector is proportional to the cosine of the phase difference between the two light waves. Consequently, the phase detector output has a small slope at small phase differences, small phase differences correspond to small rates of rotation. This means that the rate of change of the cosine function near zero will be very small. As a result, the output function provides very low sensitivity for low rotation rates.

Therefore, it is desirable to move the operating point of the phase detector from 0° to ±90° (±II/2 Rad), where the detector has high sensitivity. This is accomplished by adding a phase shift to one of the light waves. That is the function of the phase modulator (4). The phase modulator (4) (Ref: FIG. 2) is a serrodyne device that generates a phase shift proportional to the change in applied voltage at its input. The applied voltage is the sum of the voltage produced by the bias modulator and the serrodyne ramp generator.

The purpose of the biasing modulator is shown in FIG. 3(b). It is used to shift the voltage sampling point out to approximately ±90° (±II/2 Rad) where the voltage slope is maximized and, consequently, the sensitivity of the modulator is maximized. This allows the phase of the interference pattern to be accurately computed by differencing the voltage measured at the positive and negative bias points (which equals the slope of the raised-cosine curve at II/2 Rad). Therefore, small variations in rotation rate can be accurately detected and will vary linearly since the slope of the curve around ±II/2 Rad is linear.

The biasing modulator delays one of the waves by II/2 Rad with respect to the other. It does this by adding or subtracting a voltage corresponding to II/2 to the input of the phase modulator (4). As a result, the detector has its maximum sensitivity for low rotation rates. In addition, this sensitivity is close to being linear.

However, as the rotation rate increases, the response of the detector moves away from II/2, where the curve becomes less and less linear. In addition, the curve's slope flattens, thereby reducing the detector's sensitivity.

Therefore, a second modulation component is added. The other modulation component is the serrodyne ramp modulator, which applies the phase shift necessary to hold the gyro in a rebalanced condition. It provides sufficient phase change so as to cancel the phase shift difference generated by the opposite traveling light waves due to rotation.

As shown in FIG. 3(c), in order to apply a constant phase offset, the control voltage input to the phase modulator (4) must be applied as a stepped ramp which changes, each Eigen period, by an amount proportional to the desired phase shift. Since the required re-balance phase shift can be large or small, positive or negative, depending on the gyroscope's motion, the stepped ramp is correspondingly fast or slow, increasing or decreasing, as required to produce the phase shift needed to rebalance the gyroscope.

The ramp can not increase indefinitely and, at some point, must fly-back to zero. The flyback is made transparent to the gyroscope's phase modulator (4) by scaling the magnitude of the flyback voltage to correspond to the desired step size plus or minus 360° (step size ±2II Rad). This produces the same phase shift during the fly-back as is produced by the other voltage steps in the ramp, effectively making a continuous phase shift.

The composite phase modulation signal is illustrated in FIG. 3(d). This signal is the sum of the biasing modulation (a) and the serrodyne ramp modulation (c).

Therefore, closed loop operation is obtained by measuring the detector phase (6) and driving a matching phase shift into an electro-optic phase modulator (4), thus re-balancing (i.e., zeroing) the detected phase shift.

The phase shift necessary to hold the gyroscope in a rebalanced condition is directly proportional to angular velocity of the fiber spool, and the processing electronics (7) derive the rate output (19) of the gyroscope from the commanded phase shift. FIG. 2 illustrates the best prior art for the closed loop processing electronics (7). The phase detector (6) output (which in a preferred embodiment is an analog square wave) is first amplified (9) and then digitized with an A/D converter (10). The digitized output of the A/D converter is a modulated signal, which is de-modulated (11) to recover the detector phase error. (In a preferred embodiment the demodulator (11) is a square wave detector). The phase error is then integrated in a digital accumulator (12) or integrator to compute the present gyro rate. The output from the accumulator or integrator (12) corresponds to the rotational rate of the gyroscope and drives both a serrodyne modulated ramp generator (13), and the gyroscope rate output (19).

The serrodyne modulation ramp generator (13) produces a stepped digital waveform in which the step size corresponds to the amount of phase shift required to hold the phase detector (6) output at null (gyroscope phase held in a re-balanced condition). The digital output of the ramp generator (13) corresponds to the rotational rate of the gyro and is converted to a stepped analog voltage ramp by a D/A converter (14). The voltage ramp is summed (18) with a biasing modulation voltage to form a composite phase modulation signal, which is amplified (15) and used to drive the phase modulator (4). The phase modulator adds a phase shift to one of the light waves to re-balance the gyro for closed loop operation.

In a preferred embodiment, the biasing modulation voltage is generated with a square wave generator (17), which is slaved to the same bias modulation timing (16) that provides a reference to the demodulator (11).

The components of the composite phase modulation signal are illustrated in FIG. 3. As shown in FIG. 3(a), in a preferred embodiment, the biasing modulation is a square wave, switched at the gyro Eigen period. The Eigen period is simply the time required for light to propagate around the fiber spool.

Since the commanded re-balance phase shift is the gyroscope output, the linearity and stability of the transfer function between the digital phase command at the ramp generator (13) and the actual phase shift produced by the modulator (4), directly impacts gyro performance. In order to produce a high performance IFO gyroscope, this phase command transfer function must be held stable despite changes in environmental factors such as temperature, humidity, power supply voltage, etc.

The present state-of-the-art for stabilizing the phase command transfer function is embodied in a technique that utilizes a gain scaling control loop to regulate the transfer function and hold it constant despite environmental disturbances. This technique consists of regulating the gain of the serrodyne ramp modulation so as to hold the fly-back transition equal to exactly ±360° (plus the appropriate phase step for re-balance).

As shown in FIG. 2, the D/A converter (14) for the serrodyne ramp modulator has its gain controlled by a separate modulation gain-scaling D/A converter (21). This D/A (21) scales the magnitude of the serrodyne ramp and can scale the ramp magnitude such that the ramp Fly-back voltage produces either greater or lesser than 360° of phase shift at the phase modulator (4).

The gain-scaling D/A (21) is controlled by a modulation gain accumulator (20) which accumulates the phase error (6,9,10,11) produced when ramp flyback occurs. The modulation gain accumulator (20) is normally held at its accumulated value, and is enabled to run only when the ramp generator (13) signals that a ramp flyback is about to occur. Once enabled, it samples phase error (output of demodulator (11)) for two Eigen periods, so that both phases of biasing modulation are accumulated.

The gain scaling control loop formed by the modulation gain accumulator (20) and the modulation gain-scaling D/A (21) operates to stabilize the phase command transfer function by adjusting the gain of the serrodyne ramp modulation D/A (14) until the phase error measured during a fly-back event is zero, which corresponds to a phase shift of ±360°. If the gain (20,21) is slightly in error, then the fly-back phase shift will not be precisely ±360°, and a non-zero phase error will be accumulated (20). This corrects the ramp magnitude (21,14), driving it to a balanced condition in which the ramp flyback is forced to a precise ±360°.

LIMITATIONS OF PRIOR ART

There are a number of significant limitations in the prior art technique of using the serrodyne ramp fly-back to sample the full scale phase shift. These include: (1) loop interactions (acceleration-dependent errors); (2) variable sample rate; (3) poor tracking response; (4) excessive lock-in time for gain scaling control loop; (5) 1 LSB (i.e., one least significant bit) error residue; and (6) no means to optimize loop gain.

The combined effect of the above limitations often prevents the gain scaling control loop from performing its intended mission, resulting in gyroscope performance that is substantially sub-optimal. A discussion of each of these limitations is provided below.

Loop Interactions

The loop interaction effects occur because the prior art allows the phase rebalance control loop to run simultaneously with the gain-scaling control loop.

Normally, the phase-rebalance control loop is active, accumulating measured phase error in the rate accumulator (12), while the gain-scaling control loop is disabled (modulation gain accumulator (20) held). This allows the gyroscope to be actively rebalanced while the modulation gain is held static. When a ramp fly-back condition occurs, however, the modulation gain accumulator (20) is enabled, and the measured phase error is accumulated into both the rate accumulator (12) and the modulation gain accumulator (20). When this happens, both the phase-rebalance control loop and the gain scaling control loop attempt to provide corrections based on the measured phase error.

If the gyroscope acceleration is very low (phase error near zero), this may not be a significant error. When the acceleration increases, however, the phase error is non-zero and both loops attempt to correct simultaneously. This produces instabilities and interactions between the loops that dissolve into chaotic, random behavior as the gyroscope is accelerated rapidly. The net effect is acceleration-dependent errors that prevent the gyroscope from operating reliably under the conditions of non-constant velocity.

Variable Sample Rate

The variable sample rate is caused by the measurement of the full scale phase shift being keyed to the serrodyne ramp modulation fly-back, the rate of which varies widely with gyroscope angular rate. When the gyroscope is moving rapidly, the serrodyne ramp modulation fly-back can occur as often as once every 8 microseconds, but when the gyro is at near zero velocity, the fly-back can occur at rates slower than once a second.

This huge dynamic range (i.e., 125,000:1 or 102 dB) vastly complicates the problem of providing stable control of the gain scaling control loop, and forces the loop to have a very poor tracking response in an earth rate environment.

Poor Tracking Response

Because the gain-scaling control loop integrates the sampled error, the sample rate directly affects the loop gain and tracking response. The loop dynamics must be configured such that the loop exhibits stable behavior at the maximum sample rate. When the loop gain is 100 dB lower, as it is at stationary gyro rates, the tracking response in the gain scaling control loop is so poor that the loop can not effectively follow thermally induced variations in the response of the phase shift electronics (14, 18, 15, 4, 1, 6). The gain scaling control loop can not thus perform its intended mission (i.e., stabilization of the phase modulator transfer function), unless the gyro is moving at rates substantially greater than earth rate.

Excessive Lock-in Time

When the gyroscope is initially powered up, the modulation gain accumulator is in a random state. The gain scaling control loop must run for a period of time before the modulation gain accumulator (20) locks-in to it's steady state value. With the existing art, this lock-in time can be excessive (tens of minutes) unless the gyroscope is physically moved.

The excessive lock-in time is also caused by keying the measurement of the full scale phase shift to the serrodyne ramp modulation fly-back. When the gyroscope is at earth rate (near stationary), the ramp fly-back rate is very slow. This prevents the gain scaling from effectively locking-in (setting to steady state) unless the gyroscope is physically moved, which drastically increases the ramp fly-back rate. In a truly stationary environment (i.e., sense axis East, level), lock-in may never occur.

1 LSB Error Residue

The 1 LSB error residue is an artifact of the action of gain scaling control loop, which forces the phase shift produced by the serrodyne ramp modulation flyback to be 360° (i.e., zero phase shift). FIG. 4($a$) illustrates this error. Because the fly-back from full-scale to zero is defined to be zero phase shift, a 1 LSB discontinuity occurs when the ramp is incremented through the fly-back. The reason for this is as follows: A steadily incrementing ramp produces a steady phase shift. But when the fly-back is reached, the transition from FFH to 00H produces zero phase shift, which is a discontinuity with respect to the intended phase shift.

No Means to Optimize Loop Dynamics

An additional limitation of the prior art is the lack of a means to ensure that the dynamics of the phase-rebalance control loop are optimized. Overall loop gain of the phase rebalance control loop is a critical determinant of gyro stability, responsiveness, and overall performance. As such, it must be correctly aligned. However, the loop gain is affected by the detector sensitivity, fiber spool optical attenuation, and optical source power, and can vary significantly from unit to unit in production runs. The prior art does not include a mechanism to align this gain for each gyro so as to ensure uniform performance.

OBJECTS OF THE INVENTION

It is an object of the present invention to disclose a method of alignment which will substantially improve the linearity, stability and responsiveness of closed loop, interferometric fiber optic gyroscopes. The method is comprised of using a fixed-time-interval, background auto-alignment cycle to provide continuous, periodic alignment of the full scale magnitude of the phase command transfer function. Said fixed time interval is independent of gyroscope angular rate, and not linked to fly-back transitions of the serrodyne ramp modulation. The fixed time interval thus permits said background auto-alignment cycle to achieve consistent tracking response and lock-in time, regardless of the gyro motion environment.

It is a further object of the present invention to use a fixed interval background auto-alignment cycle to provide time-sliced, multiplexed control of the gyroscope's internal phase rebalance control loop and gain scaling control loop, arbitrating the two loops to enable one or the other, but never both simultaneously, and by so doing, eliminate interactions between said control loops which cause acceleration-dependent errors.

It is an additional object of the present invention to use auto-alignment logic (22) to enable the rate accumulator (12) and disable the modulation gain accumulator (20), except during occurrences of the periodic auto-alignment cycle.

It is still a further object of the present invention to use auto-alignment logic (22) to enable the modulation gain accumulator (20), and disable the rate accumulator (12), during occurrences of the periodic auto-alignment cycle.

It is another additional object of the present invention to use a multiplexer (28) to control the ramp D/A converter (14), so as to implement background auto-alignment without disturbing the operation of the gyroscope's serrodyne modulation ramp generator (13). The multiplexer thus permits continuous, periodic alignment of the gyroscope phase command transfer function without any loss of rate data.

It is still another object of the present invention to disclose a method of improving the linearity and stability of closed loop, interferometric fiber optic gyroscopes by eliminating the 1 LSB phase discontinuities produced during each roll-over of a digital serrodyne modulation ramp generator (13). The method is comprised of using code compression logic (28) to eliminate 1 count of the ramp D/A converter (14) on each roll-over of said D/A converter, thereby matching the code range of said D/A converter to the 360° phase range produced by incrementing said D/A converter through it's full range of codes.

It is still another additional object of the present invention to disclose a method for improving performance consistency between multiple units of closed loop, interferometric fiber optic gyroscopes, by aligning the loop gain of the phase rebalance control loop. The method is comprised of using an alignment modulation (23) to impart a pulse disturbance to the rate accumulator (12), in conjunction with a measurement of the phase rebalance control loop transient response. Measurement of the transient response provides a direct determinant as to whether the loop gain is properly aligned and, if not, whether it needs to be increased or decreased in order to converge on it's optimum value.

BRIEF DESCRIPTION OF THE DRAWINGS

FIG. 4 shows the over-flow of a serrodyne ramp generator during flyback.

FIG. 8 illustrates use of alignment modulation to adjust loop gain.

DETAILED DESCRIPTION OF THE INVENTION

Processing Overview

Figure 5A:
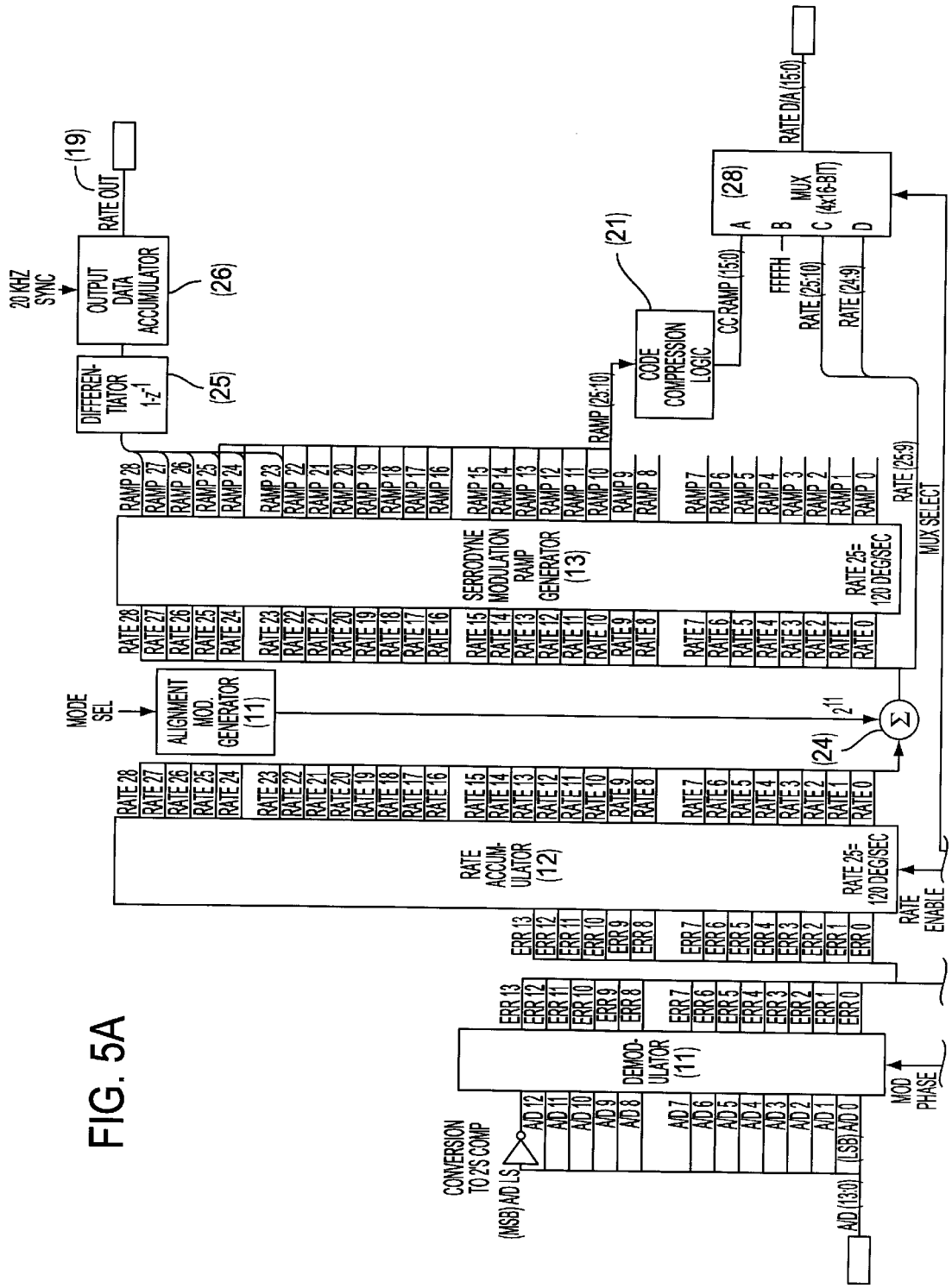
FIG. 5 is a block diagram of the digital processor used in the invention.
Figure 5B:
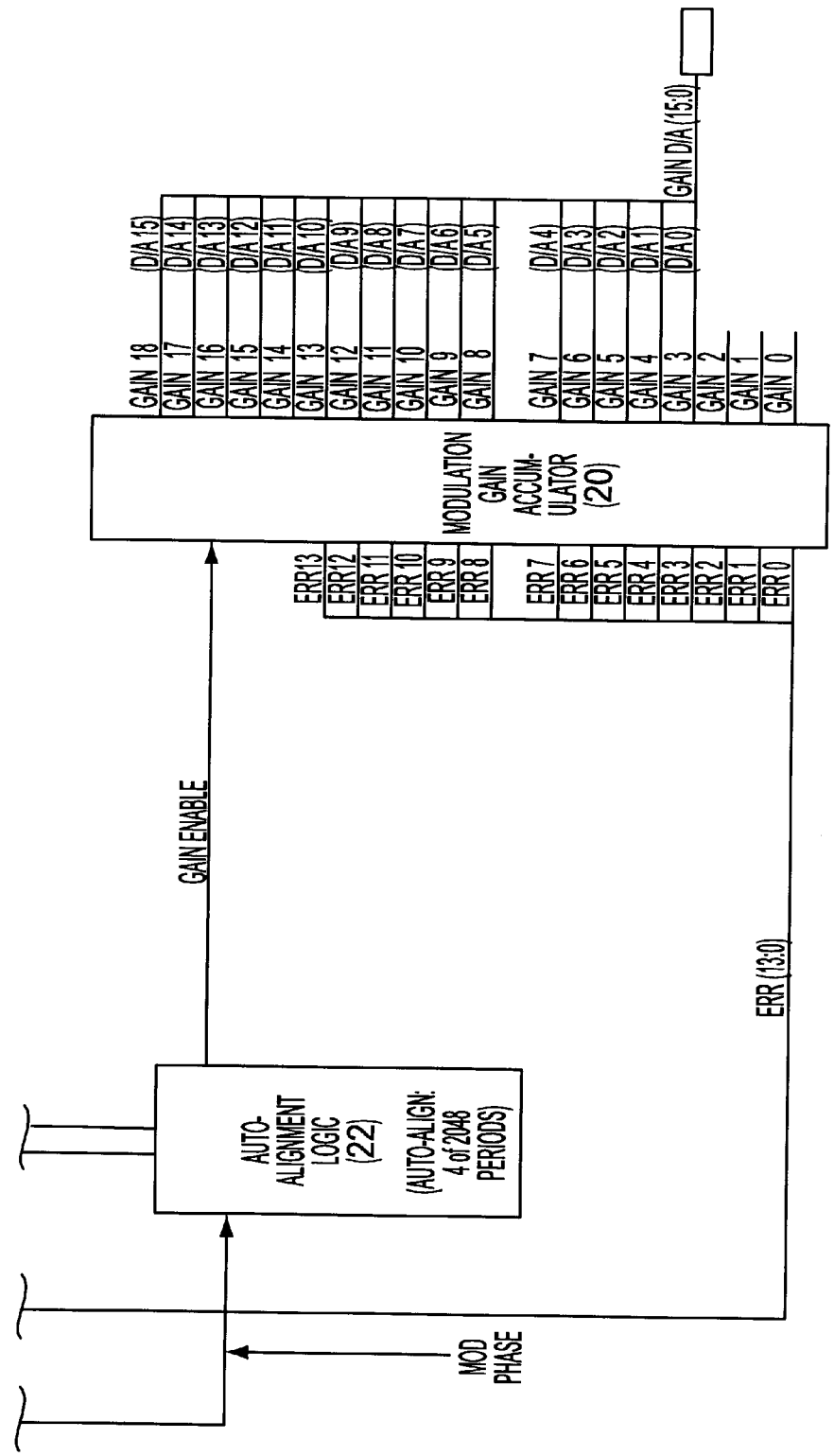

A functional block diagram of the digital processor (8) is shown in FIG. 5. This architecture incorporates the major functional blocks typical of the existing art for closed loop IFOGs. In addition, it includes several innovations (highlighted) to eliminate the problems inherent in the prior-art techniques.

The processing structure implements two independent control loops (phase rebalance and gain scaling). The phase rebalance control loop (11, 12, 13, 27, 28, 22) drives a serrodyne ramp modulation signal on the ramp D/A output, as required to zero the detected phase error at the A/D input.

Figure 1:
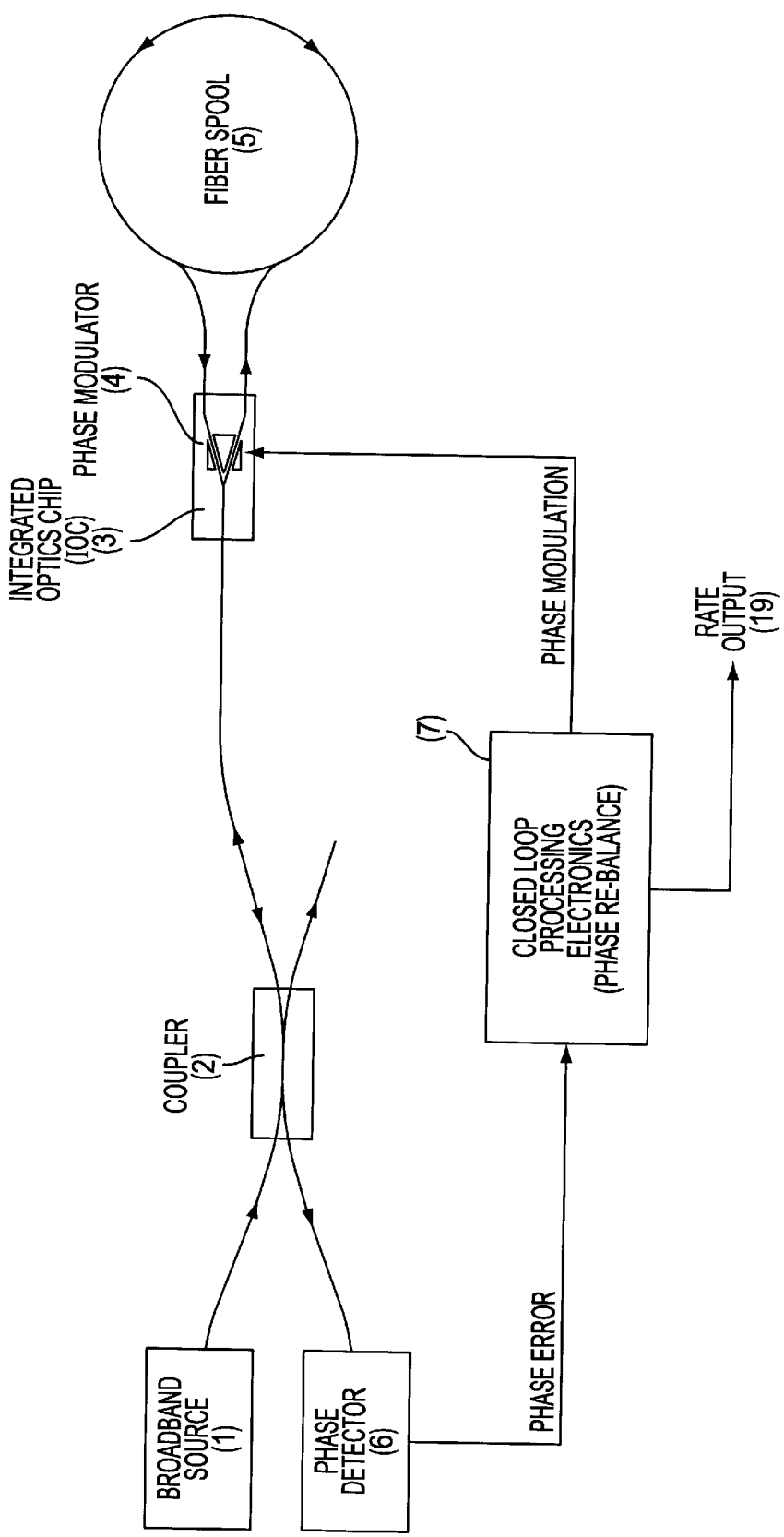
FIG. 1 is a basic block diagram of a closed loop interferometric fiber optic gyroscope.
Figure 2:
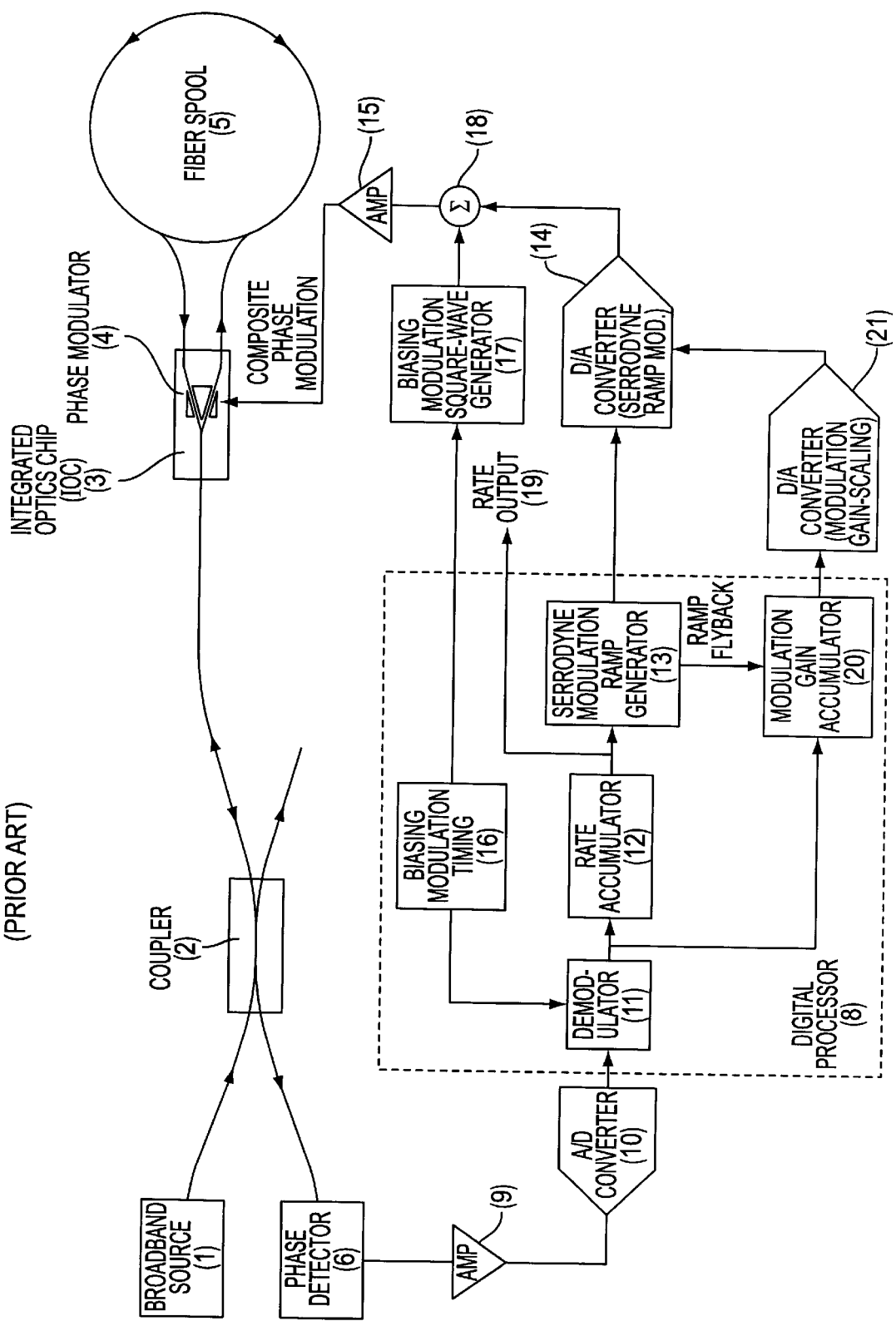
FIG. 2 is a block diagram of existing prior art for closed loop interferometric fiber optic gyroscopes.
Figure 3A:
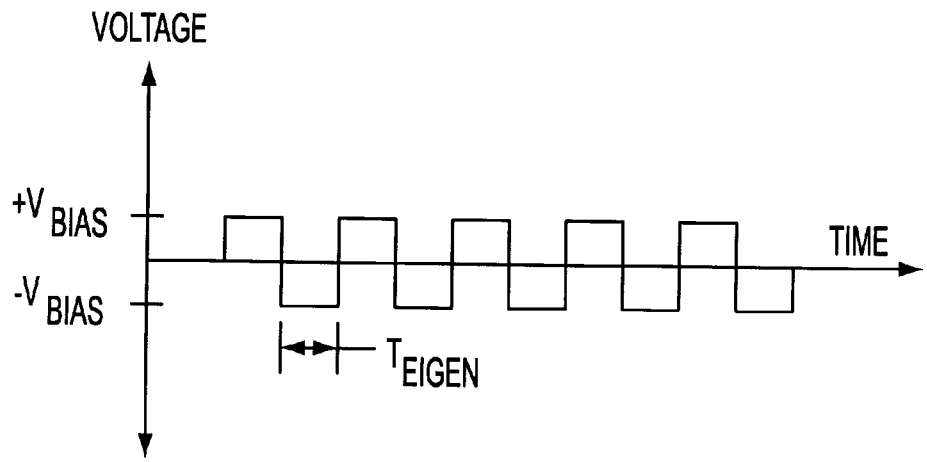
FIG. 3 shows the components of a composite phase modulation signal.
Figure 3B:
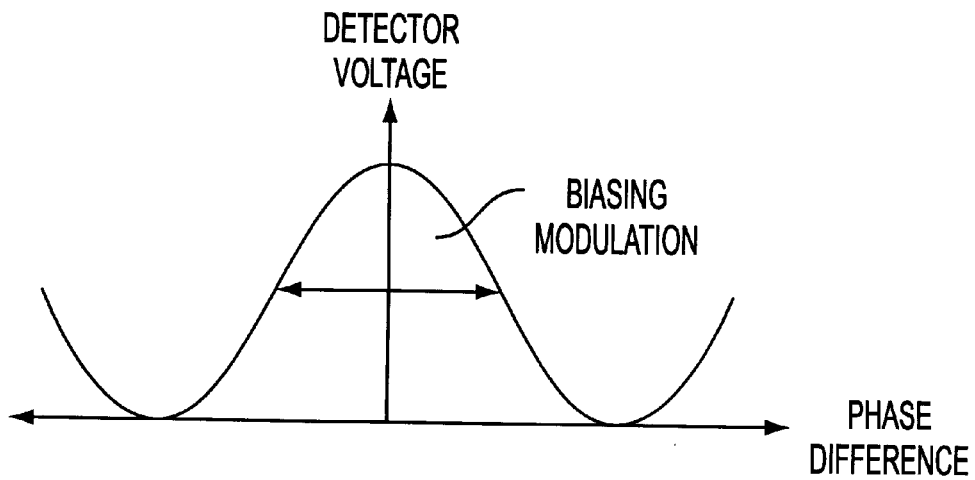
Figure 3C:
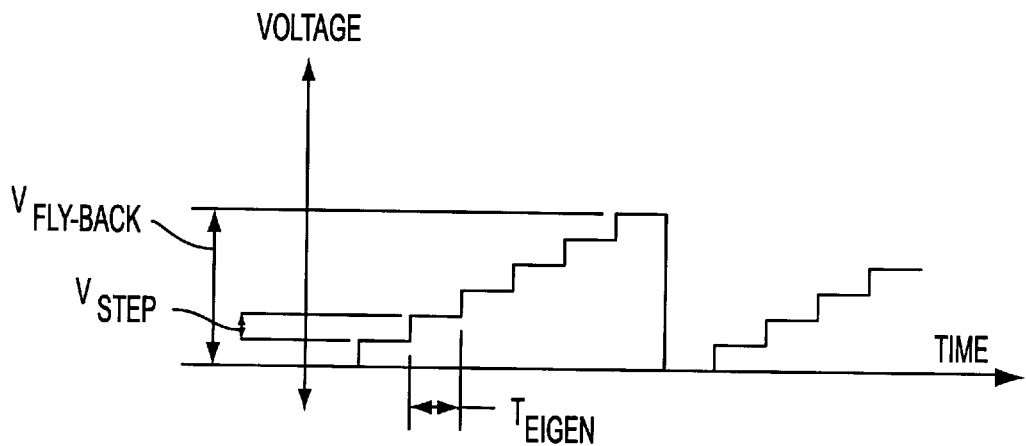
Figure 3D:
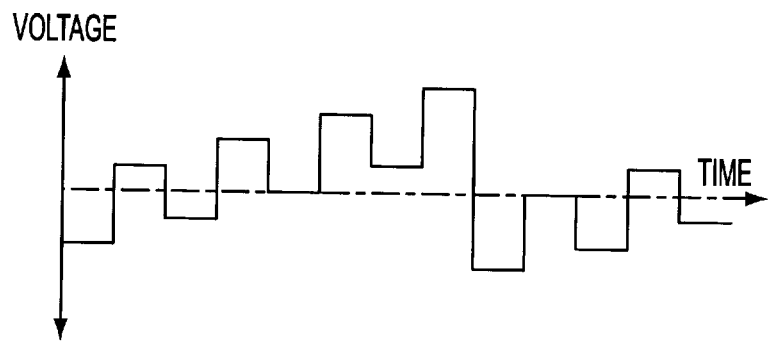

The gain scaling control loop (11, 20, 22) adjusts the value output by the gain scaling D/A (21), so as to maintain zero phase error at the A/D (10) during periodic background auto-alignment measurements. The background auto-alignment is conducted at a fixed 117 Hz rate, and consists of taking the gyro instantaneously off line long enough (16.64 us) to measure the phase command transfer function (FIG. 2: 14,18,15,4,2,6), and adjust the gain D/A (21) to hold the full scale phase shift at precisely 360°.

The gyroscope operates as a sampled data system, with an update rate equal to the gyroscope Eigen frequency. (The Eigen period is simply the time required for light to propagate around the fiber spool.) This is the basic interval for measurement cycles internal to the gyro. In a preferred embodiment, the biasing modulation (mod. phase signal) is a square wave modulation at ½ the Eigen frequency.

The input from the A/D converter (10) is a 14-bit word, in offset binary format. The MSB (A/D 13) is inverted to convert the samples to 2's complement format. The A/D input is a modulated signal, and must be demodulated to recover the phase error signal. Demodulation (11) is performed by directly accepting samples taken during even Eigen periods, and by inverting samples taken during odd Eigen periods, as coordinated by the modulation phase signal.

The output of the demodulator (11) is the loop phase error. This value will be held near zero by the closed loop action of the phase rebalance loop (11, 12, 13, 27, 28, 22).

In a preferred embodiment, the rate accumulator (12) is a 29-bit accumulator which integrates the phase error into the current estimate of gyro rate. Each Eigen period, the demodulated error signal is added to the value in the accumulator to update the rate estimate. If the gyro is perfectly rebalanced, the error signal is zero, and the rate word is static. If, however, the gyro is subjected to an angular acceleration, the error will become non-zero, and the accumulation of non-zero error will drive the rate word to converge on the new gyro rate. In this manner, the rate word is always driven to track the present gyro rate.

In a preferred embodiment the serrodyne modulation ramp generator (13) is a 29 Bit accumulator, clocked at the gyro Eigen frequency. It operates as a 26-bit ramp generator for the D/A output, with a 3-bit range extension. The range extension section permits the ramp generator to produce aliased ramp rates, which are required to support operation above the gyro's first rate ambiguity. The three bits of the range extension thus provide the capability to unambiguously track gyro rates up to a maximum of eight ambiguity roll-overs.

The gyro rate data output is produced by differentiating (25) the upper 6 bits of the ramp generator. The differentiation provides a convenient mechanism for reporting high resolution rate data via a limited resolution serial data path. (Integration of the serial data recovers the full resolution of the rate word.) The differentiator (25) is updated each Eigen period. These values are accumulated in an output buffer (26) until triggered by an external 20 kHz sync, at which time the accumulated rate data count is dumped out as a serial word, and the output data accumulator (26) is reset.

In a preferred embodiment, the modulation gain accumulator (20) is a 19-bit accumulator which integrates the phase error measured during auto-alignment to regulate the gain of the phase command transfer function (commanded phase shift at the serrodyne ramp modulation D/A converter (14) to actual phase shift at the A/D converter). This accumulator (20) is enabled for two counts (even and odd phases of biasing modulation) during each background auto-alignment interval (117 times a second). The remainder of the time, the accumulator (20) is held. When enabled, the demodulated error signal is added to the value in the accumulator (20) to update the gain estimate.

If the gain of the phase command transfer function is correct, the error signal measured during background auto-alignment is zero, and the modulation gain accumulator (20) is static. If, however, the gain of phase command transfer function begins to drift, the error will become non-zero, and the accumulation of non-zero error will drive the modulation gain accumulator (20), adjusting the transfer function gain back to it's correct value. The nominal bit weight for the gain accumulator (20) is such that an LSB provides 3 PPM of correction. The modulation gain accumulator output is directly routed to the gain D/A converter (21). This data is output as a straight binary value.

Code Compression Logic

The code compression logic (27) is a compensation for an error that would otherwise cause a 1 LSB discontinuity in the serrodyne ramp modulation. The error is an artifact of the action of gain scaling control loop, which forces the phase shift produced by a full-scale transition of the gain scaling D/A (21) to be 360° (i.e., zero phase shift).

As shown in FIG. 4(a), the serrodyne ramp modulation fly-back from full scale to zero will produce a transient if left uncompensated. A steadily incrementing ramp (1 A/D BSB each period is shown) produces a steady phase shift. But when the fly-back is reached, the transition from FFH to 00H produces zero phase shift, which is a discontinuity with respect to the intended (1 LSB) phase shift.

FIG. 4(b) shows the effect of compensating the error by employing code compression logic (27) to compress the serrodyne ramp modulation code range by 1 LSB. The transient is eliminated, and a steady phase shift is produced through the fly-back transition.

Figure 6:
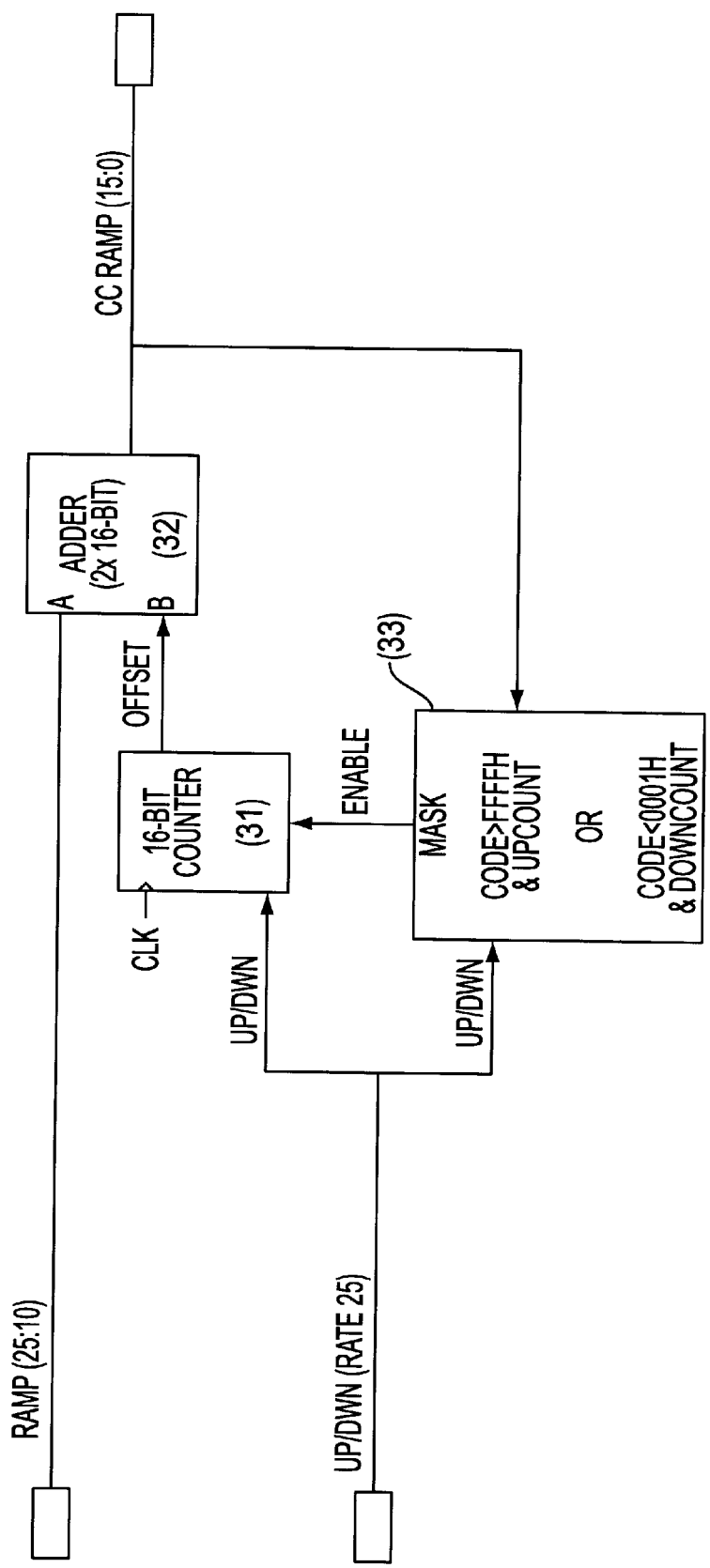
FIG. 6 is a block diagram of the code compression logic used in the invention.

FIG. 6 illustrates the functional content of the code compression logic. A counter (31) is used to generate an offset that is added (32) to the serrodyne ramp generator output. The offset counter (31) is incremented each time the CC RAMP signal rolls over (up-count), thus effectively shortening the count cycle from $2^N$ to $2^N$-1. When the ramp signal is down-counting, the counter (31) is decremented, which produces the same 1 count shortening of the count cycle. Enable logic (33) enables the counter to increment or decrement whenever the sum of the ramp plus the offset rolls over.

Multiplexed D/A Drive (P/O Auto-Alignment)

In a preferred embodiment, a 4×16-bit multiplexer (FIG. 5; 28) allows the D/A value to be momentarily switched as part of the background auto-alignment processing, while simultaneously allowing the serrodyne modulation ramp generator (13) to increment continuously (no loss of state). The normal position for the Mux (28) is the "A" channel, which routes the output of the serrodyne modulation ramp generator (13) to the serrodyne ramp modulation D/A converter (14). The other positions, used during auto-alignment, allow the following values to be output to the serrodyne ramp modulation D/A (14) on command:

B Chan: Full Scale (FFFFH)
C Chan: Rate Increment Value
D Chan: 2×Rate Increment Value The Mux output is directly routed to the serrodyne ramp modulation D/A converter (14). This data is output as a straight binary value.

Fixed Interval Background Auto-Alignment

The auto-alignment logic (22) coordinates operation of the various functions in the digital processor (8) to implement a fixed interval, background auto-alignment cycle. This cycle continuously aligns the phase command transfer function (From the digital ramp generator (13) to the actual phase shift produced at the phase detector (6)), and adjusts the Gain (20, 21) to hold the full scale phase shift exactly equal to 360°.

Figure 7:
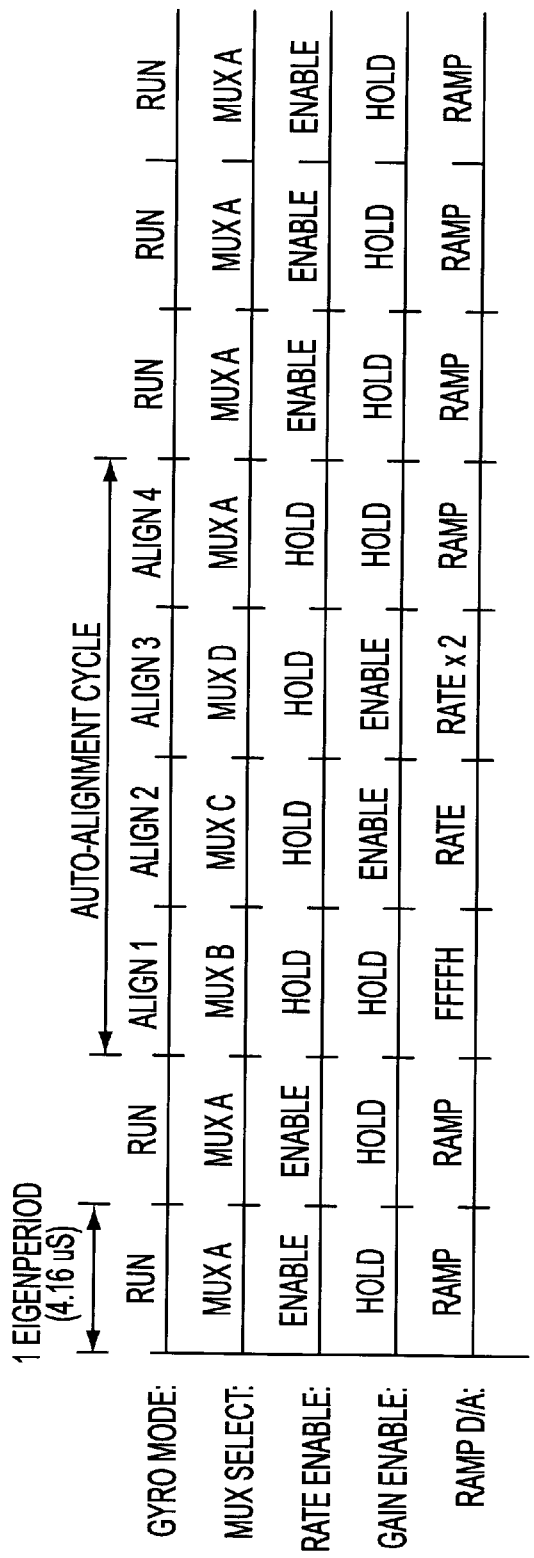
FIG. 7 illustrates the auto-alignment cycle.

The auto-alignment cycle is illustrated in FIG. 7. In a preferred embodiment, this cycle runs at a fixed interval of 117 Hz (Once each 2048 Eigen periods). During each cycle, the gyroscope's internal measurements of angular acceleration are suspended for 4 Eigen periods (16.66 uS). During this time, the magnitude of the phase command transfer function is measured and the gain accumulator is updated to null any error. At the end of the cycle, the angular acceleration measurements are resumed until the start of the next cycle (8.5 ms).

The gyroscope internally measures angular acceleration (updates its velocity estimate) on a 99.8% duty cycle. Gyroscope rate measurements are undisturbed through the auto-alignment cycle; The ramp generator (13) runs without interruption, and rate output data (26, 26, 19) is continuous. Only updates to the rate measurements (acceleration measurements) are suspended. The previous estimate of rate is held through the momentary disruption, and is updated immediately upon completion of the auto-alignment cycle. Thus, the auto-alignment cycle permits continuous, fixed-time-interval alignment of the gyro transfer function, without any loss of rate data.

By operating on a fixed cycle, independent of the gyro ramp roll-over rate, the background auto-alignment cycle eliminates many of the problems of the prior art. These include: problems associated with variable sample rate (sample rate is fixed), poor tracking response (response is optimized for fixed sample rate), and excessive lock-in time (fixed 117 Hz sample rate ensures rapid lock-in, even in stationary environments).

As shown in FIG. 7, in a preferred embodiment the auto-alignment cycle requires 4 Eigen periods. The rate accumulator (12), which is normally enabled when the gyro is in it's "Run" mode, is held for the four alignment periods. The rate value being tracked just prior to the auto-alignment cycle is held through the duration of the cycle. (This rate value is the steady-state step size for the ramp generator (13) stored in the rate accumulator (12), and is used during the cycle to provide a normal stepped increment to the ramp D/A (14).)

During the "Align 1" period, the Mux (28) is switched to channel B, applying FFFFH to the serrodyne modulation ramp generator D/A converter (14). This is a set-up period; No phase is accumulated in the modulation gain accumulator (20) during this period.

During the "Align 2" period, the Mux (28) is switched to channel C, applying the value held in the rate accumulator (12) to the ramp D/A (14). This produces a phase shift equal to Full Scale (FFFFH—0000H) plus the steady-state Rate step. During the next period (Align 3), the Mux (28) is switched to channel D, applying twice the rate word (Increment (i.e. phase shift command)=steady-state Rate step) to the ramp D/A (14). (A left shift is performed to double the rate word, i.e., bits 9 to 24 are applied using channel D, whereas bits 10 to 25 were applied using channel C).

The phase error produced at the A/D (10) during periods Align 2 and Align 3 represents the misalignment of the gain D/A (21) (Deviation of the full scale magnitude of the phase command transfer function from its desired 360° value). This error is accumulated in the modulation gain accumulator (20) during these periods, which drives the gain D/A (21) towards it's proper setting.

Ideally, this forced 360° phase shift should produce a zero phase error. Since an error signal is produced, it means that the phase command transfer function is not aligned and needs to be calibrated. This error can be used to adjust one of the components in the phase command transfer function, the serrodyne ramp modulator D/A converter (14). The modulator gain accumulator outputs the accumulated error to the modulating gain-scaling D/A converter which, in turn, scales the gain of the serrodyne ramp modulator D/A converter to compensate for this "flyback" error.

The "Align 4" period is used to restore the state of the ramp D/A (14) in preparation for resuming normal gyro operation on the next cycle. This is a set-up period; No phase is accumulated, therefore the modulation gain accumulator is disabled. The Mux (28) is returned to channel A, which outputs the ramp generator (13) to the ramp D/A (14). The gyro is switched back to it's "Run" mode on the next cycle and resumes updates to the rate accumulator (12) until the next auto-alignment cycle in which the steps recited in all four alignment periods will be repeated and any new error will be added to the error stored in modulator gain accumulator (20). In turn, this change in accumulated error will cause the modulating gain-scaling D/A converter to scale the gain of the serrodyne ramp modulator D/A converter.

The ramp generator (13) runs continuously through the auto-alignment cycle. This ensures that the gyroscope state is unaffected by the occurrence of the auto-alignment; Output data is reported without interruption, and the ramp count is undisturbed by the alignment cycle.

The auto-alignment logic (22) ensures that the rate accumulator (12) and the modulation gain accumulator (20) are never enabled simultaneously. The auto-alignment cycle of FIG. 7 thus isolates the two loops, and prevents the loop interactions. By isolating the loops and preventing loop interaction, the background auto-alignment cycle eliminates the acceleration-dependent errors which are problematic in implementations of the existing art.

Loop Gain Alignment Mode

The digital processor (8) implements a loop gain alignment mode to assist in aligning the analog front-end gain so that the overall rebalance loop gain is optimized. The loop gain alignment mode is activated by a jumper.

Overall loop gain of the phase rebalance loop is a critical determinant of gyro stability, responsiveness, and overall performance. As such it must be correctly aligned.

Loop gain for the phase rebalance loop has three basic components: digital transfer function, phase command transfer function, and analog gain. The digital transfer function is a function of internal processor bit weights, binary word widths, and bit justification, and is fixed by design of the processor (FPGA). The Phase command transfer function (processor output to optical interferometer phase) is regulated by the background auto-alignment processing. The remaining component of Loop Gain is the analog transfer function between the detector and the A/D converter. This analog gain component is not well determined, and can vary significantly from gyroscope to gyroscope.

The analog gain is affected by the detector sensitivity, fiber spool optical attenuation, and optical source power. In order to optimize gyro performance, the combined effect of these variables can be measured for each gyro using the loop gain alignment mode (bench alignment at the time of initial manufacture). The gain of the analog amplifiers can then be adjusted (via potentiometer trim) to align the overall loop gain.

The loop gain alignment mode begins by letting the gyroscope run normally for a minimum of 4 seconds to allow the auto-alignment processing to lock-in to a steady state gain value. Following the 4 second time-out, the auto-alignment processing is disabled (modulation gain accumulator held at it's last value), and the alignment modulation generator (FIG. 5; 23) is activated. The alignment modulation generator will input a bias voltage modulation into the serrodyne modulation ramp generator, which will produce a resultant transient phase displacement in the loop. In a preferred embodiment, the alignment modulation is a square-wave offset to the rate word (Bit $2^{11}$ offset (0.0073°/sec) for 16 periods, followed by zero offset for 16 periods). An external trigger output is provided to facilitate oscilloscope synchronization.

The use of the alignment modulation to align the gyroscope loop gain is illustrated in FIG. 8. If the Loop Gain is correct (FIG. 8(a)), the gyroscope will null out the transient caused by the edges of the modulation within 1 Eigen period. If the loop frame is too low (FIG. 8(b)), only a fraction of the transient will be canceled, and several periods will be required to completely null the loop. If the loop gain is too high (FIG. 8(c)), the loop will over-correct, resulting in oscillatory behavior. (If the gain is more than 6 dB high, the loop will break into sustained oscillation.)

The loop gain alignment mode is used for initial alignment of the gyroscope. Analog front-end gain will be adjusted as required to cause the loop transient response to correspond to FIG. 8(a). This process ensures that each gyroscope is trimmed for optimum performance and eliminates much of the unit to unit variations that are typical of the existing state of the art for fiber optic gyroscopes.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What we claim as our invention is:

1. A closed-loop interferometric fiber optic gyroscope, comprising:

a phase-rebalance control loop which accumulates phase error and outputs a digital signal sufficient to balance out the phase error caused by the rotation of the closed-loop interferometric fiber optic gyroscope during normal operation thereof;

a gain-scaling control loop which accumulates phase error during alignment of the closed-loop interferometric fiber optic gyroscope;

an auto-alignment logic circuit connected and electrically coupled to said phase-rebalance control loop and said gain scaling control loop, whereby only one control loop accumulates phase error at a time, said phase-rebalance control loop accumulates phase error during normal operation of the closed-loop interferometric fiber optic gyroscope and said gain-scaling control loop accumulates phase error during alignment of the closed-loop interferometric fiber optic gyroscope;

wherein said alignment is performed periodically at fixed time intervals.

2. The gyroscope according to claim 1, further comprising a demodulator having an output, said output is connected and electrically coupled to said phase-rebalance control loop and said gain-scaling control loop, whereby the demodulator demodulates the phase error and outputs it to said phase-rebalance and said gain-scaling control loops.

3. The gyroscope according to claim 2, in which said phase-rebalance control loop further comprises:

a rate accumulator having an error input, a rate enable input and a rate output;

a serrodyne modulation ramp generator having a rate input and a ramp output; and a multiplexer having a mux select input, an output and at least one input;

said rate enable input of said rate accumulator is connected and electrically coupled to said rate accumulator output of said auto-alignment logic circuit, said mux select input of said multiplexer is connected and electrically coupled to said mux select output of said auto-alignment logic circuit, said error input of said rate accumulator is connected and electrically coupled to said output of said demodulator, and said rate output of said rate accumulator is connected and electrically coupled to said rate input of said serrodyne modulation ramp generator, whereby said phase error measured during normal operation of said loop, but not during auto-alignment, is integrated.

4. The gyroscope according to claim 3, in which said phase-rebalance control loop further comprises a code compression logic circuit connected in series between said serrodyne modulation ramp generator and said multiplexer, whereby the code compression circuit shortens the count cycle of said serrodyne modulation ramp generator by generating an offset that is added to the output ramp produced by said serrodyne modulation ramp generator.

5. The gyroscope according to claim 4, in which said phase-rebalance loop further comprises a second summer having two inputs and one output connected and electrically coupled in series between said rate accumulator and said input of said serrodyne modulation ramp generator and an alignment modulation generator having an output connected and electrically coupled to said other input of said second summer, whereby said alignment modulation generator inputs an alignment modulation signal used to align the overall loop gain.

6. The gyroscope according to claim 3, in which said multiplexer has multiple inputs, whereby said inputs are used to align the loop during auto-alignment.

7. The gyroscope according to claim 6, in which said multiplexer has four inputs, channels A, B, C, and D, and one output;

channel A is connected to said output of said code compression logic circuit;

channel B is connected to a value equivalent to full scale;

channel C is connected to said rate output of said rate accumulator; and channel D is connected to said rate output of said rate output of said rate accumulator; whereby all four channels are used to align the closed-loop interferometric fiber optic gyroscope during auto-alignment.

8. The gyroscope according to claim 7, wherein said channels A, B, C, and D are connected by electrical coupling.

9. The gyroscope according to claim 3, in which said phase-rebalance loop further comprises a second summer having two inputs and one output connected and electrically coupled in series between said rate accumulator and said input of said serrodyne modulation ramp generator and an alignment modulation generator having an output connected and electrically coupled to said other input of said second summer, whereby said alignment modulation generator inputs an alignment modulation signal used to align the overall loop gain.

10. A closed-loop interferometric fiber-optic gyroscope, comprising:
   a light source for emitting a light beam;
   a phase detector having an input and an output, for outputting a phase error corresponding to the speed of rotation of the closed-loop interferometric fiber optic gyroscope;
   a coupler with four ports, wherein port one is optically coupled to said light source, and port four is electrically coupled to the input of said phase detector;
   an integrated optics chip with an input and two outputs, said input is optically coupled to either port two or port three of said coupler;
   a fiber-optic spool having a first end and a second end, one of said ends is electrically coupled to one of said outputs of said integrated optics chip and the other end is electrically coupled to the other of said outputs of said integrated optics chip, whereby said light beams will travel in counter-rotating directions through the closed-loop interferometric fiber optic gyroscope;
   a phase modulator electrically coupled in series between both of said outputs of said integrated optics chip and the corresponding ends of said fiber spool, whereby said phase modulator adds a phase delay to one of said light beams;
   a first amplifier having an input and an output, said input is connected and electrically coupled to said output of said phase detector, whereby said phase error signal is amplified;
   an analog to digital converter having an input and an output, said input is connected and electrically coupled to said output of said amplifier;
   a phase-rebalance control loop having a rate enable input, a mux select input, a rate output, and a ramp digital to analog output, whereby said phase-rebalance control loop accumulates phase error during normal operation and outputs a digital signal sufficient to balance out the phase error caused by the rotation of the closed-loop interferometric fiber optic gyroscope;
   a gain-scaling control loop having a gain enable input and a gain digital to analog output, whereby said gain-scaling control loop accumulates phase error during alignment of the closed-loop interferometric fiber optic gyroscope;
   a demodulator having an input and an output, said input is connected and electrically coupled to said output of said A/D converter and said output is connected and electrically coupled to said input of said phase-rebalance control loop and said input of said gain-scaling control loop, whereby the demodulator demodulates the phase error and outputs it to said phase-rebalance and said gain-scaling control loops;
   an auto-alignment logic circuit having a rate enable output, a mux select output and a gain enable output, said rate enable output is connected and electrically coupled to said rate enable input of said phase-rebalance control loop, said gain enable output is connected and electrically coupled to said gain-scaling control loop, and said mux select output is connected and electrically coupled to said mux select input of said phase-rebalance control loop, whereby only one control loop accumulates phase error at a time, said phase-rebalance control loop accumulates phase error during normal operation of said closed-loop gyroscope and said gain-scaling control loop accumulates phase error during alignment of the closed-loop interferometric fiber optic gyroscope;
   a biasing modulator having an output, whereby said output is used to shift the voltage sampling point out to where the voltage slope is maximized;
   a first digital to analog converter having a voltage input, a control input, and an output, said voltage input is connected and electrically coupled to said ramp digital to analog output of said phase-rebalance control loop, whereby said first digital to analog converter outputs an analog voltage equivalent of the digital input;
   a second digital to analog converter having a voltage input and an output, said voltage input is connected and electrically coupled to said gain digital to analog output of said gain-scaling control loop and said output is connected and electrically coupled to said control input of said first digital to analog converter, whereby said gain scaling control loop adjusts the value output by said second digital to analog converter so as to maintain zero phase error at said analog to digital converter during periodic background auto-alignment measurements;
   a first summer having two inputs and one output, one of said inputs is connected and electrically coupled to the output of said first digital to analog converter and the other of said inputs is connected and electrically coupled to said output of said biasing modulator;
   a second amplifier having an input and an output; said input is connected and electrically coupled to said output of said summer and said output of said amplifier is connected and electrically coupled to said input of said phase modulator;
   a differentiator having an input and an output, said input is connected and electrically coupled to said rate output of said phase-rebalance control loop; and
   an output data accumulator having an input and an output said input is connected and electrically coupled to the output of said differentiator, whereby the accumulated rate data count is stored.

11. The gyroscope according to claim 10, in which said phase-rebalance control loop further comprises:
   a rate accumulator having an error input, a rate enable input and a rate output;
   a serrodyne modulation ramp generator having a rate input and a ramp output; and
   a multiplexer having a mux select input, an output and at least one input; wherein said rate enable input of said rate accumulator is connected and electrically coupled to said rate accumulator output of said auto-alignment logic circuit, said mux select input of said multiplexer is connected and electrically coupled to said mux select output of said auto-alignment logic circuit, said error input of said rate accumulator is connected and electrically coupled to said output of said demodulator, and said rate output of said rate accumulator is connected and electrically coupled to said rate input of said serrodyne modulation ramp generator, whereby said phase error measured during normal operation of said loop, but not during auto-alignment, is integrated.

12. The gyroscope according to claim 10, in which said gain scaling control loop further comprises:
   a modulation gain accumulator having a gain enable input, an error input and a gain output;
   wherein said gain enable input is connected and electrically coupled to said gain enable output of said auto-alignment logic circuit, said error input is connected and electrically coupled to said output of said demodulator and said gain output is connected to said input of said second digital to analog converter, whereby said phase error measured during auto-alignment, but not during normal operation, is integrated.

13. The gyroscope according to claims 10, 11 or 12, in which said alignment is performed periodically at fixed time intervals.

14. The gyroscope according to claim 10, in which said demodulator is a square wave detector.

15. The gyroscope according to claim 10, in which said bias modulator is a square wave generator which outputs a square wave.

16. The gyroscope according to claim 15, in which said square wave is modulated at half the Eigen frequency.

17. The gyroscope according to claim 11, in which said serrodyne modulation ramp generator is an accumulator.

18. The gyroscope according to claim 11, in which said rate accumulator is a 29-bit accumulator, whereby the phase error is integrated into the current estimate of gyro rate.

19. The gyroscope according to claim 11, in which said phase-rebalance control loop further comprises a code compression logic circuit connected in series between said serrodyne modulation ramp generator and said multiplexer, whereby the code compression circuit shortens the count cycle of said serrodyne modulation ramp generator by generating an offset that is added to the output ramp produced by said serrodyne modulation ramp generator.

20. The gyroscope according to claim 11, in which said multiplexer has multiple inputs, whereby said inputs are used to align the loop during auto-alignment.

21. The gyroscope according to claim 20, in which said multiplexer has four inputs, channels A, B, C, and D, and one output;
    channel A is connected and electrically coupled to said output of said code compression logic circuit;
    channel B is connected and electrically coupled to a value equivalent to full scale;
    channel C is connected and electrically coupled to said rate output of said rate accumulator; and
    channel D is connected and electrically coupled to said rate output of said rate output of said rate accumulator; whereby all four channels are used to align the closed-loop interferometric fiber optic gyroscope during auto-alignment.

22. The gyroscope according to claim 11, in which said phase-rebalance loop further comprises a second summer having two inputs and one output connected and electrically coupled in series between said rate accumulator and said input of said serrodyne modulation ramp generator and an alignment modulation generator having an output connected and electrically coupled to said other input of said second summer, whereby said alignment modulation generator inputs an alignment modulation signal used to align the overall loop gain.

23. The gyroscope according to claim 22, in which said alignment modulation signal is a square wave followed by a zero offset wave.

24. The gyroscope according to claim 22, in which said alignment modulation signal is a square-wave offset to a word whose value is equivalent to the gyro rate for 16 periods, followed by zero offset for 16 periods.

25. The gyroscope according to claim 22, in which said alignment is performed periodically at fixed time intervals.

26. The gyroscope according to claim 12, in which said modulation gain accumulator is a 19-bit accumulator.

27. A method of aligning a closed-loop interferometric fiber optic gyroscope comprising:
    inputting an alignment modulation signal into said closed-loop gyroscope that includes one or more adjustable components; and
    adjusting enough of said components in said loop so that a transient caused by the edges of said alignment modulation signal will be nulled out by the closed-loop interferometric fiber optic gyroscope.

28. A method according to claim 27, in which said transient will be nulled out within one Eigen period.

29. A method according to claim 27, in which said alignment modulation signal is square-wave followed by a zero offset wave.

30. A method according to claim 27, in which said alignment modulation signal is a square-wave offset to a word whose value is equivalent to the gyro rate for 16 periods, followed by zero offset for 16 periods.

31. A method according to claim 27, in which the closed-loop interferometric fiber optic gyroscope is in normal operation before inputting said alignment modulation signal.

32. A method according to claim 31, in which the closed-loop interferometric fiber optic gyroscope is energized for at least 4 seconds before inputting said alignment modulation signal.

33. A method according to claim 27, in which said components comprise at least one amplifier.

34. A method of aligning a closed-loop interferometric fiber optic gyroscope having a phase-rebalance control loop and a gain scaling control loop comprising the steps of:
    accumulating phase error within said phase-rebalance control loop during normal operation;
    accumulating phase error in said gain scaling control loop during alignment; and
    multiplexing at a fixed time interval between said phase rebalance control loop and said gain scaling control loop such that only one of said loops is enabled at any given time.

35. A method according to claim 34, in which said method of aligning is periodically done at fixed time intervals.

36. A method according to claim 35, in which said period equals once every N Eigen periods.

37. A method according to claim 36, in which N equals 2048.

38. A method according to claim 35, in which said period equals once each 117 Hz.

39. A method of aligning a closed-loop interferometric fiber optic gyroscope having a phase-rebalance control loop and a gain scaling control loop comprising the steps of:
    accumulating phase error within said phase-rebalance control loop during normal operation;
    holding said phase-rebalance control loop from accumulating phase error;
    applying a phase shift to said closed loop;
    accumulating the resultant phase error in said gain scaling control loop;
    aligning the gain in the closed loop transfer function of said loop to negate said resultant phase error;
    holding said gain scaling from accumulating phase error; and
    accumulating phase error within said phase-rebalance control loop during normal operation.

40. A method according to claim 39, in which said method of aligning is periodically done at fixed time intervals.

41. A method according to claim 39, in which said phase shift equals full scale.

42. A method as claimed in claimed 39, in which said phase shift equals 360°.

43. A method according to claim 39, in which said step of applying a phase shift further comprises applying one or more phase shift values.

44. A method according to claim 39, in which said step of applying a phase shift further comprises:

applying a digital word equivalent to full scale;

applying a digital word equivalent to a steady state rate step; and applying a digital word equivalent to twice the steady state rate step.

45. A method according to claim 44, in which said digital word equivalent to full scale equals FFFFH.

46. A method according to claim 43 or 44, in which said steps of applying said digital words further comprises multiplexing said digital words.

47. A method according to claim 40, in which said period equals once every N Eigen periods.

48. A method according to claim 47, in which N equals 2048.

49. A method according to claim 40, in which said period equals once each 117 Hz.

50. A method of eliminating the 1 LSB phase discontinuity produced during each roll-over in a closed-loop interferometric fiber optic gyroscope comprising the step of adding an offset to the output ramp produced by said serrodyne ramp generator, whereby the count cycle of said serrodyne ramp generator is shortened.

51. The gyroscope according to claim 19, in which said phase-rebalance loop further comprises a second summer having two inputs and one output connected and electrically coupled in series between said rate accumulator and said input of said serrodyne modulation ramp generator and an alignment modulation generator having an output connected and electrically coupled to said other input of said second summer, whereby said alignment modulation generator inputs an alignment modulation signal used to align the overall loop gain.

* * * * *